Oct. 24, 1933.　　　M. P. BÉRAUD　　　1,931,838
HOT WATER AND DISTILLED WATER GENERATOR
Filed May 29, 1931
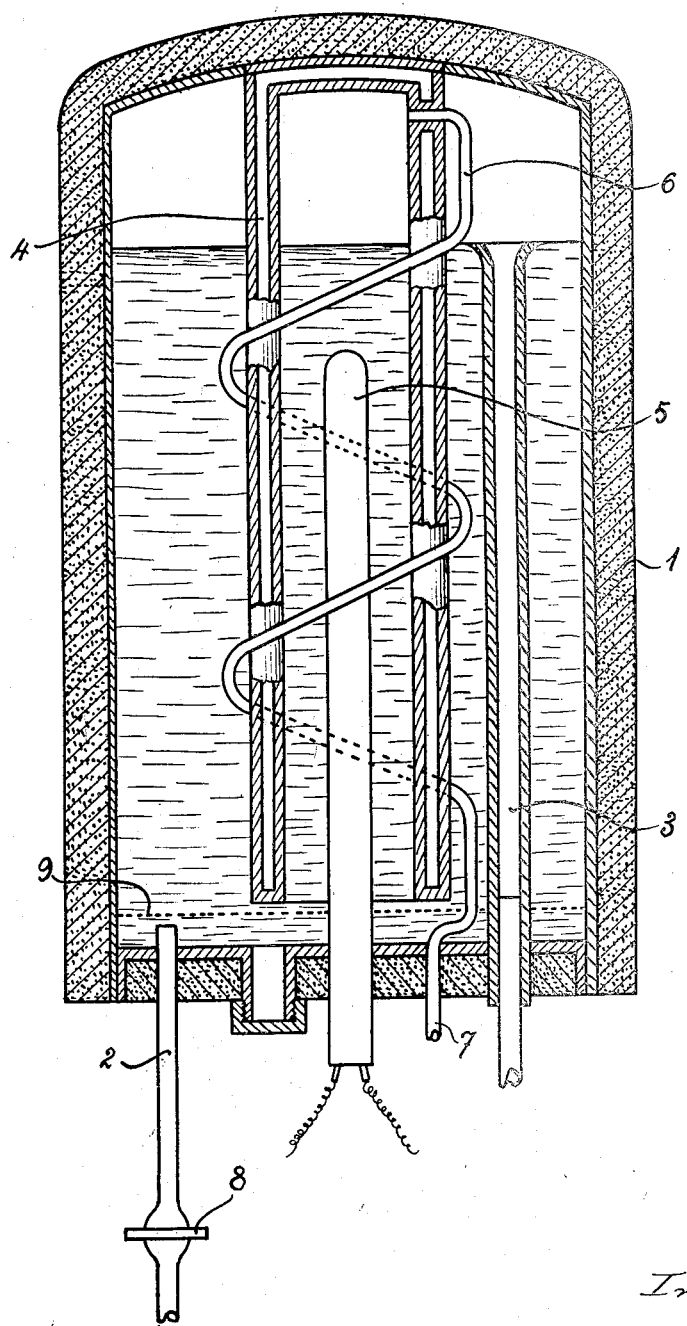
Inventor:
Marie Philippe Béraud
By
Attorney.

, Patented Oct. 24, 1933

1,931,838

UNITED STATES PATENT OFFICE 1,931,838

HOT WATER AND DISTILLED WATER GENERATOR

Marie Philippe Béraud, Vaugneray, France

Application May 29, 1931, Serial No. 541,101, and in France June 3, 1930

6 Claims. (Cl. 202—180)

My invention relates to a hot-water generator which simultaneously yields distilled water, this being a material advantage for chemists for instance.

This generator comprises an electric boiler located within a water tank which forms a condenser for the steam from said boiler. Hot water is collected at the upper part of the tank, cold water being fed at the lower part of the same, and the distillate is also separately collected. The boiler is thermally insulated from the water within the tank.

The annexed drawing diagrammatically shows in vertical section, a generator according to the invention.

A thermally insulated tank 1 is fed with cold water through a pipe 2 which opens at the lower part of said tank. The hot water flows through a pipe 3 opening at the upper part of tank 1. Pipe 3, as shown, is also carefully insulated from the surrounding cold or tepid water.

A bell-shaped boiler 4 is located within tank 1. This boiler is thermally insulated from the surrounding water by a double-wall construction as shown. An electrical heating unit 5 is arranged in boiler 4. The steam generated within the latter, is collected by a pipe 6 which forms a serpentine condenser in tank 1, co-axially with boiler 4.

The apparatus also comprises a cock 8 to control the cold-water feed. A thermostatic switch may be arranged to cut out heater 5 when the temperature rises in the lower portion of tank 1.

The water level within tank 1 (which is controlled by the overflow pipe 3) is lower than the upper part of boiler 4, which thus projects above the normal level of the water.

In operation, steam is generated within boiler 4 and escapes upwardly through pipe 6 within which it is condensed. Distilled water thus flows from the outlet of pipe 6.

The water within tank 1 thus acts as cooling medium and is thereby heated. If cock 8 is opened, the hot water flows from pipe 3. If cock 8 is closed, the hot water accumulates and the heater must be switched out when the temperature is too high. This may be automatically done by a thermostatic switch as aforesaid. There is thus provided a quantity of hot water which may be brought to flow through pipe 3 by merely opening cock 8.

A grid 9 is arranged over the outlet of pipe 2 to avoid eddies of cold water which could mix the superposed layers of water within tank 1.

I claim:

1. An apparatus for generating hot water and distilled water comprising in combination, a tank adapted to contain a body of water, means for introducing cold water into the lower part of said tank, an overflow outlet pipe for hot water at the upper part of the tank, a boiler in said tank surrounded by the water contained in the tank, the lower interior portion of said boiler being in communication with the lower portion of said tank, means for heating the water in said boiler, a steam outlet from said boiler, a condenser connected to the steam outlet and positioned in said tank and adapted to be surrounded and cooled by the water contained therein and a conduit for discharging condensate from the condenser.

2. An apparatus for generating hot water and distilled water comprising in combination, a tank adapted to contain a body of water, means for introducing cold water into the lower part of said tank, an overflow outlet pipe for hot water at the upper part of the tank, a boiler in said tank surrounded by the water contained in the tank, the lower interior portion of said boiler being in communication with the lower portion of said tank, means for heating the water in said boiler, a steam outlet from said boiler, a condenser connected to the steam outlet and positioned in said tank and adapted to be surrounded and cooled by the water container therein and a conduit for discharging condensate from the condenser, said boiler being thermally insulated from the water surrounding the same and contained in the tank.

3. An apparatus for generating hot water and distilled water comprising in combination, a tank adapted to contain a body of water, means for introducing cold water into the lower part of said tank, an overflow outlet pipe for hot water at the upper part of the tank, a boiler in said tank surrounded by the water contained in the tank, the lower interior portion of said boiler being in communication with the lower portion of said tank, means for heating the water in said boiler, a steam outlet from said boiler, a condenser connected to the steam outlet and positioned in said tank and adapted to be surrounded and cooled by the water container therein and a conduit for discharging condensate from the condenser, said boiler being in the form of an open bottom bell-shaped container, and the upper portion of said boiler extending above the surface of the water in said tank.

4. An apparatus for generating hot water and distilled water comprising in combination, a tank adapted to contain a body of water, means for introducing cold water into the lower part of said tank, an overflow outlet pipe for hot water at the upper part of the tank, a boiler in said tank surrounded by the water contained in the tank, the lower interior portion of said boiler being in communication with the lower portion of said tank, means for heating the water in said boiler, a steam outlet from said boiler, a condenser connected to the steam outlet and positioned in said tank and adapted to be surrounded and cooled by the water container therein, a conduit for discharging condensate from the condenser and a grid over the cold water inlet into said tank for avoiding the setting up of eddy currents therein.

5. An apparatus for generating hot water and distilled water comprising in combination, a tank adapted to contain a body of water, means for introducing cold water into the lower part of said tank, an overflow outlet pipe for hot water, said pipe extending upwardly through the water in said tank from the bottom thereof to a point adjacent the top thereof, and insulating material surrounding said pipe to prevent the flow of heat from water passing therethrough, a boiler in said tank surrounded by the water contained in the tank, the lower interior portion of said boiler being in communication with the lower portion of said tank, means for heating the water in said boiler, a steam outlet from said boiler, a condenser connected to the steam outlet and positioned in said tank and adapted to be surrounded and cooled by the water contained therein and a conduit for discharging condensate from the condenser.

6. An apparatus as set forth in claim 3 wherein the heating means extends upwardly through the bottom of the tank, through the water in the tank and into the open bottom of the boiler.

MARIE PHILIPPE BÉRAUD.